(12) United States Patent
Baasch et al.

(10) Patent No.: US 7,584,832 B2
(45) Date of Patent: Sep. 8, 2009

(54) APPARATUS FOR THE ADJUSTMENT CAPABILITY OF TWO FRICTIONAL SHIFTING COMPONENTS

(75) Inventors: Detlef Baasch, Friedrichshafen (DE); Olrik Weinmann, Eriskirch (DE)

(73) Assignee: ZF Friedrichshafen AG, Freidrichschafen (DE)

( * ) Notice: Subject to any disclaimer, the term of this patent is extended or adjusted under 35 U.S.C. 154(b) by 360 days.

(21) Appl. No.: 11/437,563

(22) Filed: May 19, 2006

(65) Prior Publication Data
US 2006/0260897 A1    Nov. 23, 2006

(30) Foreign Application Priority Data
May 21, 2005    (DE) .................... 10 2005 023 389

(51) Int. Cl.
F16D 28/00     (2006.01)
F16H 48/22     (2006.01)

(52) U.S. Cl. .................. 192/48.2; 192/49; 192/84.6; 192/84.91; 192/94

(58) Field of Classification Search .............. None
See application file for complete search history.

(56) References Cited

U.S. PATENT DOCUMENTS

| | | | |
|---|---|---|---|
| 4,895,236 A * | 1/1990 | Sakakibara et al. | ........ 192/84.6 |
| 4,950,214 A | 8/1990 | Botterill | |
| 6,533,090 B2 * | 3/2003 | Osborn et al. | ............... 192/48.2 |
| 6,698,565 B2 | 3/2004 | Cool et al. | |
| 6,711,968 B2 | 3/2004 | Krzesicki et al. | |
| 6,779,420 B2 * | 8/2004 | Peura | .......................... 74/650 |
| 6,805,653 B2 | 10/2004 | Krzesicki et al. | |
| 6,851,537 B2 | 2/2005 | Bowen | |
| 2007/0034441 A1 * | 2/2007 | Pelchen et al. | ............... 180/337 |

FOREIGN PATENT DOCUMENTS

| | | |
|---|---|---|
| DE | 198 07 023 A1 | 9/1998 |
| DE | 103 42 164 A1 | 4/2005 |
| EP | 0 662 402 A1 | 7/1995 |
| WO | WO 2005/035294 A1 * | 4/2005 |

* cited by examiner

Primary Examiner—Rodney H Bonck
(74) Attorney, Agent, or Firm—Davis & Bujold, P.L.L.C.

(57) ABSTRACT

An apparatus for adjusting the power transfer capabilities of two, shifting elements, by way of which output torque of a transmission of a vehicle can be conducted in a direction transverse to the longitudinal axis of the vehicle to driving wheels of a drivable vehicle axle with the inherent degrees of apportionment as conducted in relationship to the power transfer capability of the shifting elements. Each shifting element has an electric motor; a transmission operationally connected with the electric motor; and placed between the shifting element and the transmission apparatus, a drive converter apparatus, by way of which rotationally directed drive of the electric motors is respectively transformed into a translational activation motion for the control of the shifting elements. The drive converter apparatuses respectively possess a first drive element and a second drive element of which one drive element, converse to the other drive element, is of translational movement.

10 Claims, 2 Drawing Sheets

US 7,584,832 B2

APPARATUS FOR THE ADJUSTMENT CAPABILITY OF TWO FRICTIONAL SHIFTING COMPONENTS

This application claims priority from German Application Serial No. 10 2005 023 389.9 filed May 21, 2005.

FIELD OF THE INVENTION

The invention concerns an apparatus for the adjustment of the power transfer capability of two frictionally based shifting elements.

BACKGROUND OF THE INVENTION

Drive trains for known vehicles, which trains are outside of the practice are advantageously equipped with frictional based shifting elements (such as disk clutches), by means of which, with the aid of the shifting element possessing an actually adjusted power transfer capability, a torque acting in a vehicle axle running between two powered wheels, can be separated within the limits of the driving conditions.

The power transfer capabilities of the shifting elements, which are mostly designed as lamella clutches, i.e., friction shifting elements, are respectively and advantageously adjusted by an electromechanical actuator, which possesses an electric motor, a gear train operationally bound to the electric motors and which are further in connection with a drive-converter apparatus for the transformation of the rotational acting drive of the electric motor into a translatory activation movement for the control of the related shifting element. In this arrangement, the power transfer capabilities of such frictional shifting elements is increased by way of drive converter activations which are increasing in the closure direction of the shifting element, which is counter to the opening direction of the shifting activity of a spring in the opening direction.

The reversal of the rotary drive of the electric motors into translation, activation motions for the shifting elements is done by way of drive converters, which respectively again possess a first drive element and a second drive element from which the drive element for the control of the shifting element opposite to the respective other drive element is translatorily moveable. In this assembly, the transformation occurs by way of a spindle/spindle nut arrangement, spherical-ramp arrangement by which the operational connection between drive elements can be characterized by defined increasing of the windings or the curve tracks.

In order to hold the operating force of an electric motor to the lowest possible level, upon the closure of a shifting element, the practice has developed such a method that the increase is so to be carried out, that the frictional moment between the drive converter and the shifting elements respectively support the rotational drive of the electric motor.

However this is disadvantageous in that the support of the electric motors assigned to the shifting elements is to be carried out with drive converters of respectively different lead angles, whereby the manufacturing costs of the actuator is raised into undesirable heights.

The present invention has the purpose to make an apparatus for the adjustment of the power transfer capability of two frictionally based shifting elements available, which can be economically manufactured.

SUMMARY OF THE INVENTION

In the case of the invented apparatus for the adjustment of power transfer capability of two, friction based, shifting elements, by way of which a vehicle transmission output torque can be conducted in a direction transverse to the longitudinal axis of the vehicle to driven wheels on a driven axle, limited by existing differential gradients of the power transfer capability of the shifting elements. The functional elements are an electric motor, a gear train assembly operationally connected to the electric motor and a drive converter placed between a shifting element and a gearing train.

By way of a drive converter apparatus, respectively, a rotary drive of an electric motor can be transformed into a translatory activation motion for the control of a shifting element. For this purpose, the drive converter possesses, respectively, a first drive element and a second drive element by way of which one drive element, contrary to the other element, can be set in translation motion for the control of the shifting element. The power transfer capability of the shifting element varies according to the control condition of the drive converter, whereby the control condition of the drive converters stand under the influence of the torques of the electric motors, which torques can be carried by the transmission to the drive converter.

According to the invention, in a case of one of the drive converters, the first drive element is translatory moveable in relation to the then axially affixed second drive element. Where the other drive converter is concerned, the second drive element is translatory movable in relation to the then axially affixed first drive element.

Thereby in the area of both drive converters apparatuses, the generated frictional forces for the minimizing of the drive torque of the electric motors, upon the closure of the shifting elements, are useful and both drive converter apparatuses can be designed with the same lead, whereby the manufacturing costs of the apparatus, in comparison to a conventional actuator, have been reduced in a very simple way and manner.

BRIEF DESCRIPTION OF THE DRAWINGS

The invention will now be described, by way of example, with reference to the accompanying drawings in which.

DETAILED DESCRIPTION OF THE INVENTION

Figure 1:
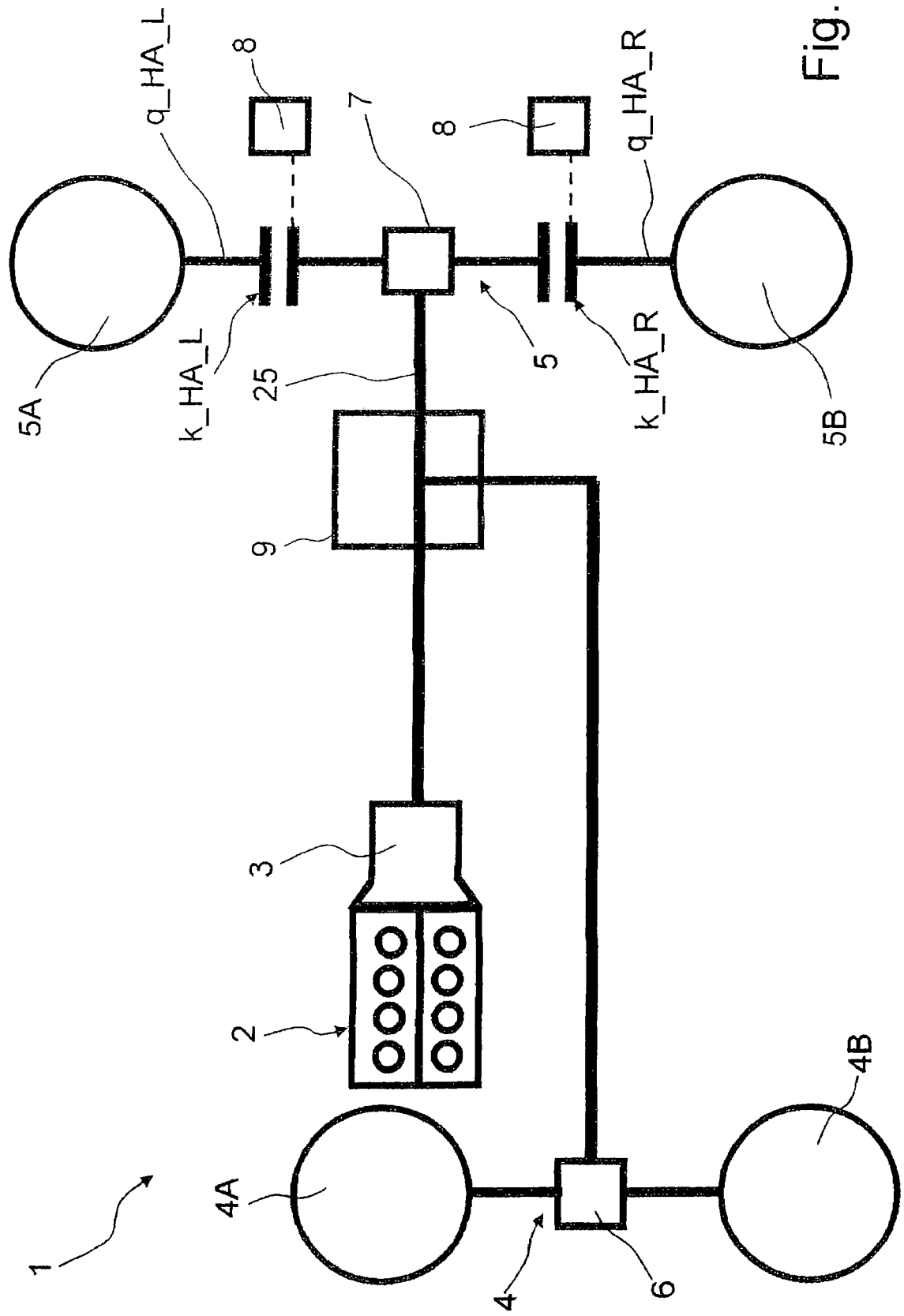
FIG. 1 is a schematic representation of a part of a drive train of a vehicle.

FIG. 1 shows a drive train 1 of a vehicle, which here is serving with a 4-wheel drive, the principal components are presented in a schematic manner.

The drive train 1 encompasses an engine 2, a principal transmission 3, which can be any transmission as known in the practice. The drive engine 2, in the case of the embodiment or the drive train 1 shown in FIG. 1, is depicted as an internal combustion engine (hereinafter "motor") and, in one advantageous development, can be an electric motor.

Between the principal transmission, which is presented to indicate the presence of different gear ratios and a first torque driven axle 4, which said axle, of any appropriate known manufacture, has mounted on each transverse end at least one driven wheel 4A, 4B and is further equipped with a differential gear 9. In addition, a differential 6 is to be found which allows for compensation of the rate of rotation for each of the wheels 4A and 4B on the first axle 4, whereby the differential 6 is presently designed as a known differential in the transverse axle 4.

Additionally, between first, an axle gear train 7 (again a differential), by way of which a running portion of the torque of the motor 2 is received at a second driven vehicle axle 5, whereupon the torque is communicated in the directions of two driven wheels 5A, 5B and second, respectively one of driven wheels 5A, 5B of the second driven vehicle axle 5 and a first clutch k_HA_L and a second clutch k_HA_R, respectively, located in transverse trains q_HAL and q_HA_R.

The presence of the differential gearing 6 gives rise to the possibility that the driven wheels 4A and 4B of the first axle 4, which can be either a forward or a rear axle of the vehicle, can operate independently of each other with respect to the travel path differences experienced by the rights side, i.e., left side wheel tracks, bringing about correspondingly different lengths of passage on each stated side and correspondingly different rotational speeds. When this occurs, the torque is apportioned symmetrically and thereby sway-free between the two wheels 4A and 4B of the first vehicle axle 4.

Conversely thereto, the transverse apportionment of that portion of the drive torque conducted by the second axle 5 which, equally well could be either the front or rear axle of the vehicle, is carried out by way of the variably responsive power transfer capabilities of the two clutches, namely k_HA_L and k_HA_R, whereby, respectively, one of the these two clutches k_HA_L and k_HA_R is driven synchronously, while the respective other clutch of k_HA_R and k_HA_L is allowed to slip. Simultaneously, in relation to the power transfer capability of the now slipwise driven clutch k_HA_L and k_HA_R of the second axle 5, a differentiating degree of the that portion of the drive torque between 0% and 100% sent to the second axle 5 can be realized on one of the two wheels 5A, 5B.

As this is accomplished, the degree of apportionment with the control of the first clutch k_HA_L and the second clutch k_HA_R, now stands in such a relative position that the total portion of the driving torque, which is sent to the second vehicle axle 5, is conducted to that wheel 5A or 5B in the amount of 100%, whichever of the two is associated with synchronously drive clutch k_HA_R and k_HA_L, if the respective other coupling, k_HA_L and k_HA_R, of the differential train q_HA_L and q_HA_R is driven with such a reduced power transfer capability that, through this particular clutch, no torque is being transferred.

Figure 2:
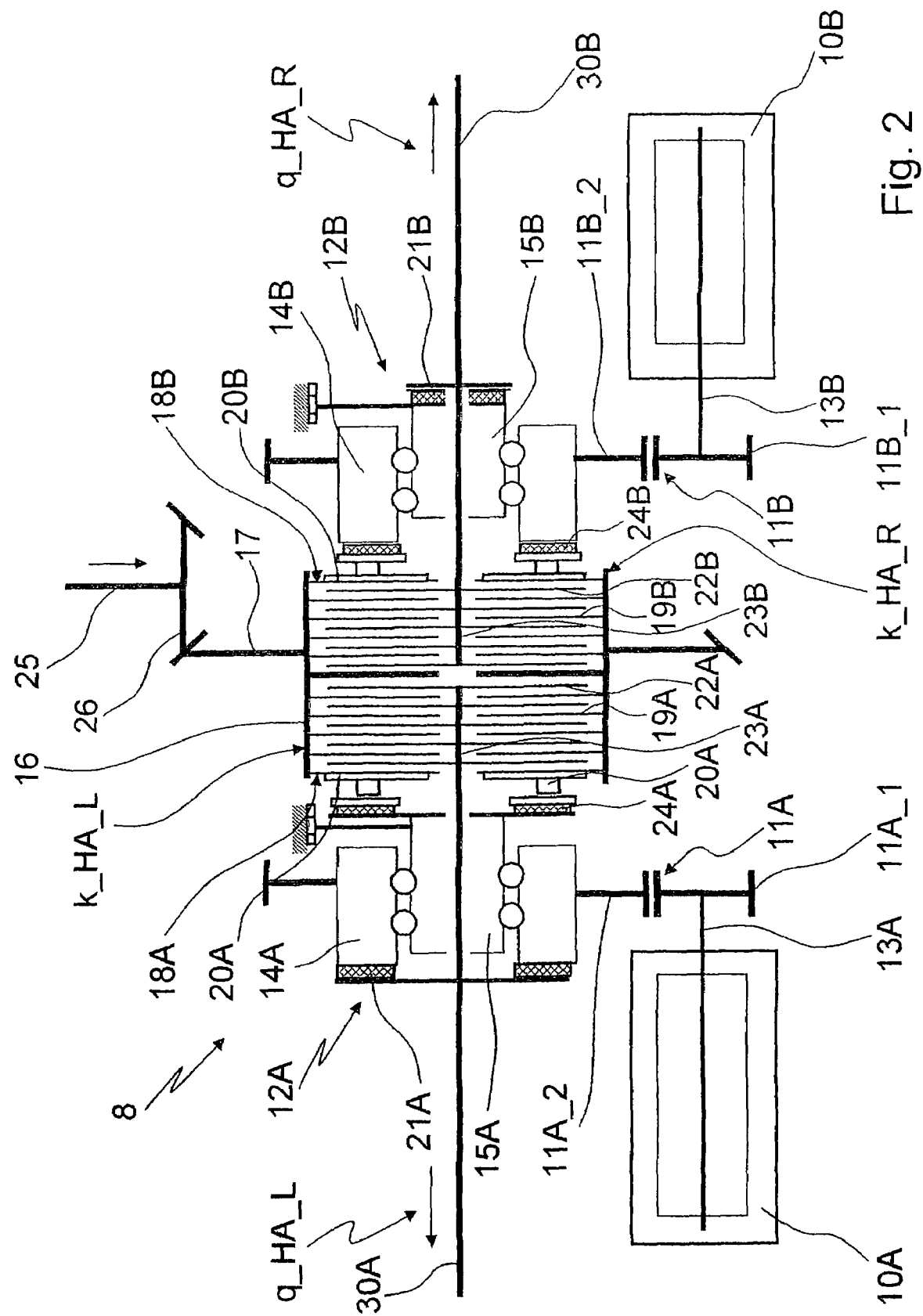
FIG. 2 is another schematic representation of an invented apparatus for the adjustment of the power transfer capability of two friction based shifting elements again in a schematic presentation.

The two clutches k_HA_L and k_HA_R, of the drive train 1, in the present case, a control and regulated, friction based lamella clutches are designed, the power transfer capabilities of which are adjustable by way of an actuator 8, shown in FIG. 2, and which clutches are to be located on the power output side of a gear train output of the schematically depicted differential 9, shown in FIG. 1.

In the case of the two clutches k_HA_L and k_HA_R, the possibility arises of apportioning, in a variable and according to need, that amount of the drive torque 2, which is conducted from the motor to the axle 5, e.g., that amount being a gear train output torque of the differential 9 and between drive wheel 5A and 5B of the second vehicle transverse axle 5.

As shown in FIG. 2, the assembly shows an actuator 8 for the adjustment of the power transfer capabilities of two frictionally based shifting elements, namely, the first clutch k_HA_L and the second clutch k_HA_R. Further in the actuator 8, for each of the clutches k_HA_L and k_HA_R, respectively, is to be found electric motors 10A, 10B, respectively transmissions 11A, 11B which are correspondingly associated with the electric motor 10A, 10B and respectively drive converters 12A, 12B; each of which is situated between one of the shifting elements k_HA_L and k_HA_R and one of the transmissions 11A, 11B. By way of the drive converters 12A and 12B, the rotary drive of the respective electric motor 10A, 10B is transformed into a translatoral activation motion in order that the power transfer capabilities of the shifting elements k_HA_L and k_HA_R may be adjusted within the limits of the actual operational performance of the described 4-wheel drive vehicle.

In the present case, the transmissions 11A and 11B are designed as spur gear stages, whereby the gear trains, in a different formulation of the actuator 8, could appear as planetary gear sets or again be produced in yet another appropriate combination.

A first gear 11A_1 of the transmission 11A, in the arrangement shown in FIG. 2, is rotatably affixed to a drive shaft 13A of the electric motor 10A. Correspondingly and respectively, a twin first gear 11B_1 of the transmission 11B is rotatably affixed to a drive shaft 13B of the electric motor 10B. This pair of first gears 11A_1 and 11B_1 mesh respectively with second gears 11A_2 and 11B_2. In this arrangement, the later gears are, in turn, rotatably affixed with respective, spindle nut 14A, 14B of the respective drive converter 12A, 12B. In this way and in each case, the rotational movement of the second gear 11A_2, 11B_2 is directly transferred to the spindle nut 14A, 14B.

The spindle nut 14A of the first drive converter apparatus 12A is rotatable and is aligned in an axial direction by way of a first axial support bearing 21A, which the support is transversely positioned with reference to an axial shaft 30A of the vehicle, particularly of the cross apportionment train q_HA_L. The existing first drive converter 12A serves as a spindle/spindle nut assembly with a first converter apparatus 12A constructed as a ball-ramp arrangement and an increase of the ball-ramp threading are, in this case, so designed that the spindle nut 14A of the shifting element k_HA_L possesses a turning direction during a closing procedure, which is the same as that of first transverse shaft 30A which, in turn, is bound to an inner lamella carrier 23A of the shifting element k_HA_L. The spindle nut 14A of the first drive converter 12A is so driven by the electric motor 10A through a closure movement of the shifting means k_HA_L that a rotationally fixed spindle 15A of the first drive converter 12A, by way of the rotating of the spindle nut 14A is moved in an axial direction relative to a lamella packet 18A of the shifting element k_HA_L, thereby compressing the lamella packet 18A. By this action, the frictional forces between the spindle nut 14A and the first axial shaft 30A are increased.

Since the first axial shaft 30A rotates itself in the same direction of turning as does the spindle nut 14A, the slipping torques acting in the area, between the spindle nut 14A and the first transverse shaft 30A, support a rotational motion of the spindle nut 14A as well as a closure procedure of a shifting element k_HA_L. In this way, a concurrent achievement is that a driving torque emanating from the electric motor 10A during the closure operation of the shifting element k_HA_L is reduced in relation to a closing procedure of a shifting element, while the first transverse shaft 30A and the spindle nut 14A are driven in different directions of rotation.

Between the spindle 15A and the lamella packet 18A, in the present embodiment, is provided a further axial bearing apparatus 24A as well as a pressure disk 20A by way of which, during a closure action on the part of shifting element k_HA_L, an active force is brought against the lamella packet 18A, whereby, because of the additional axial bearing apparatus 24A, the different speeds of rotary motion of the pressure disk 20A and the slip free designed spindle 15A compensate themselves by strongly reduced frictional forces.

The second drive converter 12B, likewise is serving as a spindle/spindle nut assembly with a spherical-ramp arrangement and is built with the same slope as the first drive converter 12A. In order, that even in the area of this second drive converter 12B, to be able to involve as support, those slip torques evolved try upon the closure of the second shifting element k_HA_R, a spindle 15B of the second drive converter 12B is installed to allow both a rotational as well as an axial movement direction by the axial support bearing 21B, whereby the spindle 15B of the second drive connector 12B in axial direction is fixed over an axial bearing 21B at the second axial shaft 30B. A lamella packet 18B of the second shifting element k_HA_R is controlled by the spindle nut 14B of the second drive converter 12B, which is so installed as to allow axial movement.

So that the spindle nut 14B of the second drive converter 12B may be achieved during a closure procedure on the part of the shifting element k_HA_R possessing the same direction of rotation as is the case with a bevel gear 17, which is bound to an outside lamella carrier 16 of the shifting elements k_HA_L and k_HA_R. In this way, slipping torques support the closure procedure of the shifting element k_HA_R, which arise because of frictional forces between the spindle nut 14B and the lamella packet 18B of the shifting element k_HA_R.

Alternative to the embodiment example of the invented actuator 8. shown in the drawing, it is possible that the drive converters can be made as conventional spindle/spindle nut assemblies or a ball-ramp arrangement in order that the rotational drive of the electric motors 10 are able to become transformed into translatory activation motions for the shifting elements.

Between the lamella packet 18B of the shifting element k_HA_R and the spindle nut 14B is to be found a pressure disk 20B, which is rotationally bound to an outer lamella 19B, which rotates with the same speed of rotation in the operation of the drive train 1 as does the outside lamella carrier 16. The spindle nut 14B of the second drive converter apparatus 12B is moved by a closure movement of the shifting element k_HA_R in the direction of the pressure disk 20B. The pressure disk 20B moves the spindle nut 14B with increasing axial displacement speed onto the lamella packet 18B during the closure procedure of the shifting element k_HA_R. In this way, the frictional forces increase themselves between the pressure disk 20B and the spindle nut 14B with increasing change of position of the spindle nut 14B and the preselected slip-torques reinforce a rotational movement of the spindle nut 14B as well as a closure of the shift element k_HA_R. An axial support apparatus 24B exists between the pressure disk 20B and the spindle nut 14B, so that frictional forces between the spindle nut 14B and the pressure plate 20B are reduced.

As a whole, by this means, in spite of difficulties, what is achieved is that the electric motor 10B, brought forth during a closure procedure of the shifting element k_HA_R, in comparison to a closure procedure of a shifting element, during which the pressure disk 20B and the spindle nut 14B are driven with different directions of rotation, is reduced.

The lamella packet 18A and 18B are respectively made up of outside lamellas 19A, 19B, whereby inner lamellas 22A, 22B converted, respectively, with an inner lamella carrier 22A, 22 whereby the inner lamella carrier 22A, 22B connected respectively with the inner lamella carrier 23A, 23B are slidably bound, rotationally fixed and slidably bound in the axial direction of the axial shafts 30A, 30B. The outside lamella 19B are bound with the outer lamella carrier 16 rotatably fast and slidable in the axial direction of the transverse shafts 30A, 30B.

The shifting elements k_HA_L and k_HA_R are placed axially on the vehicle transverse axle 5 between the drive converters 12A and 12B and the axial shafts 30A and 30B run coaxially through the spindles 15A and 15B which are constructed from at least partially hollow shafts, wherewith the drive torque carried by a drive shaft 25 can be conducted by way of the shifting elements k_HA_L and k_HA_R to the wheels 5A and 5B of the second axle 5 which axle is operatively connected to the transverse shafts 30A and 30B.

The inner lamella carriers 23A, 23B are rotatably affixed, but not allowed axial movement freedom on the transverse shafts 30A, 30B, whereby the pressure disks 20A and 20B, by way of spring apparatuses which are not further described, by function as plate springs, exert force on the inner lamella carriers 23A, 23B counter to the closure direction of the shifting elements k_HA_L and k_HA_R. In this way, the pressure disks 20A, 20B, during an opening phase of the shifting elements k_HA_L and k_HA_R, wherein the spindle 15A and spindle nut 14B are moved away from the shifting elements by way of the spring arrangement in the direction of the drive converters 12A and 12B, whereby the power transfer capabilities of the shifting elements k_HA_L and k_HA_R, limited by the degree of opening of the shifting elements are reduced, that is to say, may be completely removed.

Corresponding to the predetermined control of the electric motors 10A and 10B, adjusted power transfer capabilities of the shifting elements k_HA_L and k_HA_R, a portion of the drive torque, which is conducted over the drive shaft 25, which drive shaft is in operational connection with the output of the differential gearing 9, to the shifting elements, communicated by way of an additional bevel gear 26, the bevel gear 17 and the shifting element k_HA_L and k_HA_R onto the transverse shafts 30A and 30B, whereby the bevel gears 17 and 26 form the axle gear train 7.

This means that the power transfer capabilities of the shifting elements k_HA_L and k_HA_R varies according to the control situation of the drive converters 12A and 12B and the control situations of the drive converters 12A and 12B, governed by the drive torque of the electric motors 10A, 10B which have been communicated through the transmissions 11A and 11B to the drive converters 12A and 12B. Additionally, the arrangement of the spring apparatus, which acts in the opening direction of the shifting elements k_HA_L and k_HA_R, leads to a situation wherein the power transfer capability of the shifting element is reduced if the electric motors are deprived of power.

Finally, the shifting elements k_HA_L and k_HA_R are fully open and the wheels 5A and 5B of the drivable vehicle axle 5 are completely independent motor-sided part of the drive train 1.

REFERENCE NUMERALS

1 Drive train of motor vehicle
2 Driving machine, internal combustion engine (in text "motor")
3 Principal transmission
4 First vehicle transverse axle
4A, 4B Driven wheels on first transverse axle
5 Second vehicle transverse axle
5A, 5B Driven wheel of second transverse axle
6 Differential
7 Axle gear train
8 Actuator apparatus
9 Differential
10A, 10B Electric motor
11A, 11B Transmission apparatus
11A_1, 11A_2 Gears
11B_1, 11B_2 Gears
12A, 12B Drive converters 13A, 13B Drive shaft for electric motor
14A, 14B Spindle nut
15A, 15B Spindle
16 Outside lamella carrier
17 Bevel gear
18A, 18B Lamella packet
19A, 19B Outside lamella
20A, 20B Pressure plate (washer type)
21A, 21B Axial support bearing
22A, 22B Inner lamellas
23A, 23B Inner lamella carrier
24A, 24B Axial bearing apparatus
25 Drive shaft
26 Additional bevel gear
30A, 30B Axial shaft
k_HA_L First clutch, a shifting element
k_HA_R Second clutch, a shifting element
q_HA_L Transverse train
q_HA_R Transverse train

The invention claimed is:

1. An apparatus (8) for adjusting a power transfer capability of two frictional shifting elements (k_HA_L, k_HA_R), which conduct an output torque of a transmission (3, 9) of a vehicle in a direction transverse to a longitudinal axis of the vehicle, to driving wheels (5A, 5B) of a drivable vehicle axle (5), the apparatus comprising:

a first shifting element (k_HA_L) and a second shifting element (k_HA_R) for apportioning a power transfer capability from the transmission to the driving wheels (5A, 5B), the first shifting element (k_HA_L) having an electric motor (10A) operationally connected to a first transmission apparatus (11A), and the second shifting element (k_HA_R) having an electric motor (10B) operationally connected to a second transmission apparatus (11B);

a first drive converter apparatus (12A) located between the first shifting element (k_HA_L) and the first transmission apparatus (11A), and the first drive converter apparatus (12A) transforming rotationally directed drive from the electric motor (10A) of the first shifting element (k_HA_L) into a translational activation motion for controlling the first shifting element (k_HA_L);

a second drive converter apparatus (12B) located between the second shifting element (k_HA_R) and the second transmission apparatus (11B) of the second shifting element (k_HA_R), and the second drive converter apparatus (12B) transforming a rotationally directed drive from the electric motor (10B) of the second shifting element (k_HA_R) into a translational activation motion for controlling the second shifting element (k_HA_R); and a drive element (14A, 15A) of the first drive converter apparatus (12A) and a drive element (14B, 15B) of the second drive converter apparatus (12B), a first portion (14B) of the drive element (14B, 15B) of the second drive converter apparatus (12B) and a first portion (15A) of the drive element (14A, 15A) of the first drive converter apparatus (12A) are translationally movable while second portion (14A) of the drive element (14A, 15A) of the first drive converter apparatus (12A) and a second portion (15B) of the drive element (14B, 15B) of the second drive converter apparatus (12B) are axially fixed;

the two frictional shifting elements (k_HA_L, kHA_R) are directly axially adjacent and share a common disk carrier (16); and the second portion (14A) of the drive element (14A,15A) of the first drive converter apparatus(12A) is driven by the electric motor (10A) of the first transmission apparatus (11A), and the first portion (14B) of the drive element (14B,15B) of the second drive converter apparatus (12B) is driven by the electric motor (10B) of the second transmission apparatus (11B).

2. The apparatus according to claim 1, wherein the second portion (14A) of the drive element (14A, 15A) of the first drive converter apparatus (12A) abuts a first axial support device (21A) on a first transverse shaft (30A) which is fixed to a first driving wheel (5A) and the second portion (15B) of the drive element (14B,15B) of the second drive converter apparatus (12B) abuts a second axial support device (21B) on a second transverse shaft (30B) which is fixed to a second driving wheel (5B).

3. The apparatus according to claim 2, wherein one of the first shifting element (k_HA_L) and a first inner lamella carrier (23A) is operationally connected with a first driving wheel (5A) via a first transverse shaft (30A), and one of the second shifting element (k_HA_R) and a second inner lamella carrier (23B) is operationally connected with a second driving wheel (5B) via a second transverse shaft (30B) the first and the second transverse shafts (30A, 30B) are respectively operationally placed coaxially within the drive element (14A, 15A) of the first drive converter apparatus (12A) and the drive element (14B, 15B) of the second drive converter apparatus(12B), both of the drive elements (14A, 14B, 15A, 15B) of the first drive converter apparatus (12A) and of the second drive converter apparatus (12B) are at least partially hollow shafts.

4. The apparatus according to claim 1, wherein a first axial support device (24A) is provided between the first portion (15A) of the drive element (14A, 15A) of the first drive converter apparatus (12A) and the first shifting element (k_HA_L) and a second axial support device (24B) is provided between the first portion (14B) of the drive element (14B, 15B) of the second drive converter apparatus (12B) and the second shifting element (k_HA_R).

5. The apparatus according to claim 1, wherein the first and second shifting elements (k_HA_L, k_HA_R) are located in an axial direction of the first and second vehicle transverse shaft (30A, 30B) between the first and second drive converter apparatuses (12A, 12B).

6. The apparatus according to claim 1, wherein the second portion (14A) of the drive element (14A, 15A) of the first drive converter apparatus (12A) is operationally connected to the first shifting element (k_HA_L) such that the second portion (14A) of the drive element (14A, 15A) of the first drive converter apparatus (12A), during an engagement procedure of the first shifting element (k_HA_L), has a same direction of rotation as the first shifting element (k_HA_L), and the first portion (14B) of the drive element (14B, 15B) of the second drive converter apparatus (12B) is operationally connected to the second shifting element (k_HA_R) such that the first shifting element (k_HA_L) and the first portion (14B) of the drive element (14B, 15B) of the second drive converter apparatus (12B), during an engagement procedure of the second shifting element (k_HA_R), have a same direction of rotation as the second shifting element (k_HA_R).

7. The apparatus according to claim 1, wherein each of the first and the second drive converter apparatuses (12A, 12B) comprises a spindle-spindle-nut-assembly, each having a first drive element as a spindle and a second drive element as a spindle nut.

8. The apparatus according to claim 1, wherein each of the first and the second drive converters (12A, 12B) is a ball-ramp arrangement.

9. The apparatus according to claim 1, wherein each of the first and the second drive converters (12A, 12B) is made as a spindle-spindle-nut-assembly with a ball ramp arrangement, and the first portion (15A) of the drive element (14A, 15A) of the first drive converter (12A) is a spindle and the second portion (15B) of the drive element (14B, 15B) of the second converter apparatus (12B) is a spindle nut.

10. An apparatus (8) for adjusting a power transfer capability of two frictional shifting elements, which direct a transmission output torque in a direction transverse to a longitudinal axis of the vehicle the apparatus comprising:

a left shifting element (k_HA_L) and a right shifting element (kHA_R) which apportion the transmission output torque to left and right drive wheels (5A, 5B), the left shifting element (k_HA_L) having an electric motor (10A), which is operationally connected to a left transmission apparatus (11A), and the right shifting element (k_HA_L) having an electric motor (10B), which is operationally connected to a right transmission apparatus (11B);

a left drive converter (12A) transforming rotational drive from the electric motor (10A) of the left shifting element (k_HA_L) into a translational motion for controlling the left shifting element (k_HA_L);

a right drive converter apparatus (12B) transforming a rotational drive from the electric motor (10B) of the right shifting element (k_HA_R) into a translational motion for controlling the right shifting element (k_HA_R); and the left drive converter (12A) having an outer drive element (14A) and an inner drive element (15A), the outer drive element (14A) of the left drive converter (12A) being axially aligned with and radially located outside of the inner drive element (15A) of the left drive converter (12A), the inner drive element (15A) of the left drive converter (12A) axially slides to bias the left shifting element (k_HA_L) into engagement, the outer drive element (14A) of the left drive converter (12A) is axially fixed, and the right drive converter (12B) has an outer drive element (14B) and an inner drive element (15B), the outer drive element (14B) of the right drive converter (12B) is axially aligned with and radially located outside of the inner drive element (15B) of the right drive converter (12B), the outer drive element (14B) of the right drive converter (12B) axially slides to bias the right shifting element (k_HA_R) into engagement, and the inner drive element (15B) of the right drive converter (12B) is axially fixed.

* * * * *